(No Model.)
E. MARTIN.
SPARK ARRESTER.
No. 422,957. Patented Mar. 11, 1890.
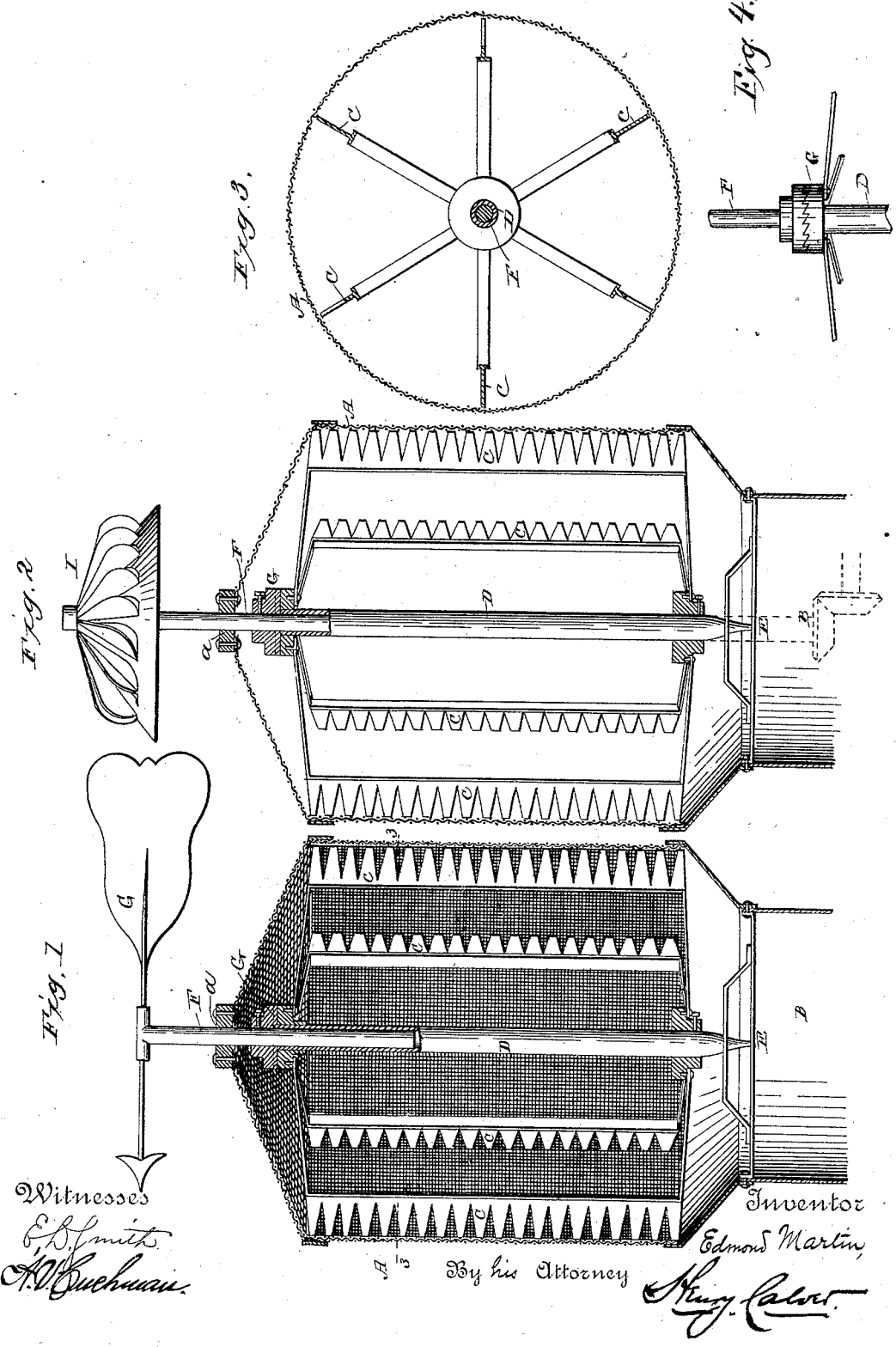
Witnesses
Inventor
Edmond Martin,
By his Attorney

UNITED STATES PATENT OFFICE.

EDMOND MARTIN, OF POTSDAM, NEW YORK.

SPARK-ARRESTER.

SPECIFICATION forming part of Letters Patent No. 422,957, dated March 11, 1890.

Application filed November 30, 1889. Serial No. 332,112. (No model.)

*To all whom it may concern:*

Be it known that I, EDMOND MARTIN, a citizen of the United States, residing at Potsdam, in the county of St. Lawrence and State of New York, have invented certain new and useful Improvements in Spark-Arresters, of which the following is a specification, reference being had therein to the accompanying drawings.

More or less difficulty has heretofore arisen in the use of open-work or foraminous screens which are placed on the tops of smoke-stacks or chimneys for the purpose of arresting sparks, owing to the clogging of such screens by soot and cinder. My invention has for its object to remove this difficulty by providing such screens with movable metallic scrapers which will keep the screens free from soot and cinder and which may be operated by the wind or air currents or mechanically.

In the accompanying drawings, Figure 1 is a vertical section of one form of my invention. Fig. 2 is a similar view, but with the background of the screen omitted, showing a slightly-different form of my invention. Fig. 3 is a horizontal section on line 3 3 of Fig. 1. Fig. 4 is a detail view of the ratchet-clutch.

A denotes an open-work or foraminous screen or cage, made in any well-known manner, and B is a smoke-stack, to which said screen or cage is attached in any suitable way. Within the screen or cage A is placed a movable or rotary scraper consisting of a series of wings or blades C, arranged in close proximity to the inner surface of said screen or cage and attached to a central shaft or spindle D, the latter being preferably pointed at its lower end and stepped in a cross-piece or support E, attached to the smoke-stack. The shaft or spindle D, in the form of my invention shown in Fig. 1, is made hollow, and is entered at its top by the stem F of a wind-vane G, said stem passing downward through a bearing-piece *a* at the top of the screen or cage. The wings of the scraper are preferably formed with teeth or fingers, as shown, these teeth or fingers being arranged on the different wings, so that the inner surface of the screen which is unswept by the teeth or fingers of one blade will be swept by the teeth or fingers of the next blade, these teeth or fingers being more effective and working more easily as scrapers than plain blades would.

To secure the constant rotation of the scraper in one direction from the oscillating wind-vane, so as to insure that all portions of the inside of the screen will be swept by the scraper, the connection of the stem E of the wind-vane is preferably made by a ratchet-clutch H, one portion of which is attached to the said stem and the other portion of which is secured to the scraper. Thus when the wind-vane moves in one direction the ratchet-teeth on one part of the clutch attached to the wind-vane stem will ride over the other ratchet-teeth, and when the said vane swings in the opposite direction the two sets of ratchet-teeth will be in engagement, and partial rotation will thus be given to the scraper, so that as the wind-vane oscillates back and forth a step-by-step rotary movement in one constant direction will be imparted to the scraper and the inner surface of the cage will be kept free from soot and cinder.

Instead of using the wind-vane for rotating the scraper, as above described, such rotation may be effected by a wind-wheel I, arranged horizontally at the top of the screen or cage A, as shown in Fig. 2, said wind-wheel being rotated to rotate the scraper by the ascending currents of heated air.

As still another means for effecting the rotation of the scraper, the central shaft or spindle thereof may be extended downward, as indicated by dotted lines in Fig. 2, and provided with a gear-wheel to be engaged by another gear-wheel driven by any suitable machinery.

From the foregoing it will be apparent that I provide a simple and effective means for keeping spark-arresting screens or cages free from soot or cinder, so that the draft of the smoke-stack or chimney will not be obstructed.

Having thus described my invention, I claim and desire to secure by Letters Patent—

1. The combination, with a stationary spark-arresting screen or cage, of a movable scraper arranged within the same and having metallic wings or blades arranged in close proximity to the inner surface thereof.

2. The combination, with a stationary spark-arresting screen or cage, of a movable scraper arranged within the same and having wings or blades formed with teeth or fingers which are arranged in close proximity to the inner surface of said screen or cage.

3. The combination, with the stationary spark-arresting screen or cage A, of a movable scraper consisting of a series of metallic wings or blades C, a central shaft with which said wings or blades are connected, and a wind-vane for rotating said scraper.

4. The combination, with the stationary spark-arresting screen or cage A, of a movable scraper consisting of a series of wings or blades C, a central shaft with which said wings or blades are connected, and a wind-vane having a ratchet-clutch connection with said scraper for rotating the same.

In testimony whereof I affix my signature in presence of two witnesses.

EDMOND MARTIN.

Witnesses:
C. E. SANFORD,
FRANK F. DOUGLAS.